US009648463B2

(12) United States Patent
Seyde et al.

(10) Patent No.: US 9,648,463 B2
(45) Date of Patent: May 9, 2017

(54) METHOD AND APPARATUS FOR PROVIDING CONTEXT-RELATED POINT-OF-INTEREST RECOMMENDATIONS

(71) Applicant: HERE Global, Veldhoven (NL)

(72) Inventors: Daniel Cornelius Manuel Seyde, Berlin (DE); Olivier Dousse, Lausanne (CH); Frank Gaebler, Berlin (DE)

(73) Assignee: HERE GLOBAL B.V., Veldhoven (NL)

( * ) Notice: Subject to any disclaimer, the term of this patent is extended or adjusted under 35 U.S.C. 154(b) by 0 days.

(21) Appl. No.: 14/576,922

(22) Filed: Dec. 19, 2014

(65) Prior Publication Data

US 2016/0183060 A1   Jun. 23, 2016

(51) Int. Cl.
*H04W 24/00* (2009.01)
*H04W 4/02* (2009.01)
*G06Q 10/04* (2012.01)
*G06Q 30/02* (2012.01)

(52) U.S. Cl.
CPC ............ *H04W 4/028* (2013.01); *G06Q 10/04* (2013.01); *G06Q 30/0261* (2013.01)

(58) Field of Classification Search
CPC .................................................... H04W 4/028
USPC .................................................... 455/456.3
See application file for complete search history.

(56) References Cited

U.S. PATENT DOCUMENTS

| 7,487,918 B2* | 2/2009 | Kudo ................. G01C 21/3484 235/384 |
| 7,885,762 B2* | 2/2011 | Tajima ............... G01C 21/3617 701/423 |
| 8,209,275 B2 | 6/2012 | Tsui et al. |
| 2003/0046158 A1 | 3/2003 | Kratky |
| 2007/0290039 A1 | 12/2007 | Pfleging et al. |
| 2008/0288165 A1* | 11/2008 | Suomela ............ G01C 21/3641 701/533 |
| 2013/0103300 A1 | 4/2013 | Rakthanmanon et al. |

(Continued)

OTHER PUBLICATIONS

Office Action for corresponding European Patent Application No. 15199523.0-1958, dated Apr. 12, 2016, 8 Pages.

*Primary Examiner* — Amancio Gonzalez
(74) *Attorney, Agent, or Firm* — Ditthavong & Steiner, P.C.

(57) ABSTRACT

An approach is provided for providing context-related destination location recommendations. The destination recommendation platform determines at least one context associated with at least one user. The platform processes and/or facilitates a processing of mobility pattern information associated with the at least one user to determine one or more predicted destination locations and associated probability information based, at least in part, on the at least one context. The probability information represents respective one or more probabilities that the at least one user will travel to the one or more predicted destination locations under the at least one context. The platform further determines entropy information based, at least in part, on the probability information. The platform determines whether to cause, at least in part, a presentation of one or more recommended destination locations to the at least one user based, at least in part, on the entropy information.

22 Claims, 12 Drawing Sheets

(56) References Cited

U.S. PATENT DOCUMENTS

2014/0064112 A1* 3/2014 Das .................. G01S 19/48
370/252
2014/0163849 A1* 6/2014 Adam ............... G01C 21/3492
701/118
2014/0344204 A1   11/2014 Grenn

* cited by examiner

400

430

METHOD AND APPARATUS FOR PROVIDING CONTEXT-RELATED POINT-OF-INTEREST RECOMMENDATIONS

BACKGROUND

Service providers and device manufacturers (e.g., wireless, cellular, etc.) are continually challenged to deliver value and convenience to consumers by, for example, providing deliver personalized content. One area of interest has been providing recommendations that can address the user's desire to discover new interesting places or user's needs (e.g., food). However, generic mapping and navigation applications cannot infer user's desires and/or needs. As such, the generic mapping and navigation applications provide general point of interest recommendations without considering the user's desires, needs and/or openness of receiving point of interesting recommendations. Accordingly, service providers and device manufacturers face significant technical challenges to enabling customized recommendations to a user.

SOME EXAMPLE EMBODIMENTS

Therefore, there is a need for an approach for providing context-related point-of-interest recommendations.

According to one embodiment, a method comprises determining at least one context associated with at least one user. The method also comprises processing and/or facilitating a processing of mobility pattern information associated with the at least one user to determine one or more predicted destination locations and associated probability information based, at least in part, on the at least one context. The probability information represents respective one or more probabilities that the at least one user will travel to the one or more predicted destination locations under the at least one context. The method further comprises determining entropy information based, at least in part, on the probability information. The method comprises determining whether to cause, at least in part, a presentation of one or more recommended destination locations to the at least one user based, at least in part, on the entropy information.

According to another embodiment, an apparatus comprises at least one processor, and at least one memory including computer program code for one or more computer programs, the at least one memory and the computer program code configured to, with the at least one processor, cause, at least in part, the apparatus to determine at least one context associated with at least one user. The apparatus is also caused to process and/or facilitate a processing of mobility pattern information associated with the at least one user to determine one or more predicted destination locations and associated probability information based, at least in part, on the at least one context. The probability information represents respective one or more probabilities that the at least one user will travel to the one or more predicted destination locations under the at least one context. The apparatus is further caused to determine entropy information based, at least in part, on the probability information. The apparatus is also caused to determine whether to cause, at least in part, a presentation of one or more recommended destination locations to the at least one user based, at least in part, on the entropy information.

According to another embodiment, a computer-readable storage medium carries one or more sequences of one or more instructions which, when executed by one or more processors, cause, at least in part, an apparatus to determine at least one context associated with at least one user. The apparatus is also caused to process and/or facilitate a processing of mobility pattern information associated with the at least one user to determine one or more predicted destination locations and associated probability information based, at least in part, on the at least one context. The probability information represents respective one or more probabilities that the at least one user will travel to the one or more predicted destination locations under the at least one context. The apparatus is further caused to determine entropy information based, at least in part, on the probability information. The apparatus is also caused to determine whether to cause, at least in part, a presentation of one or more recommended destination locations to the at least one user based, at least in part, on the entropy information.

According to another embodiment, an apparatus comprises means for determining at least one context associated with at least one user. The apparatus also comprises means for processing and/or facilitating a processing of mobility pattern information associated with the at least one user to determine one or more predicted destination locations and associated probability information based, at least in part, on the at least one context. The probability information represents respective one or more probabilities that the at least one user will travel to the one or more predicted destination locations under the at least one context. The apparatus further comprises means for determining entropy information based, at least in part, on the probability information. The apparatus also comprises means for determining whether to cause, at least in part, a presentation of one or more recommended destination locations to the at least one user based, at least in part, on the entropy information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing context-related point of interest recommendations are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
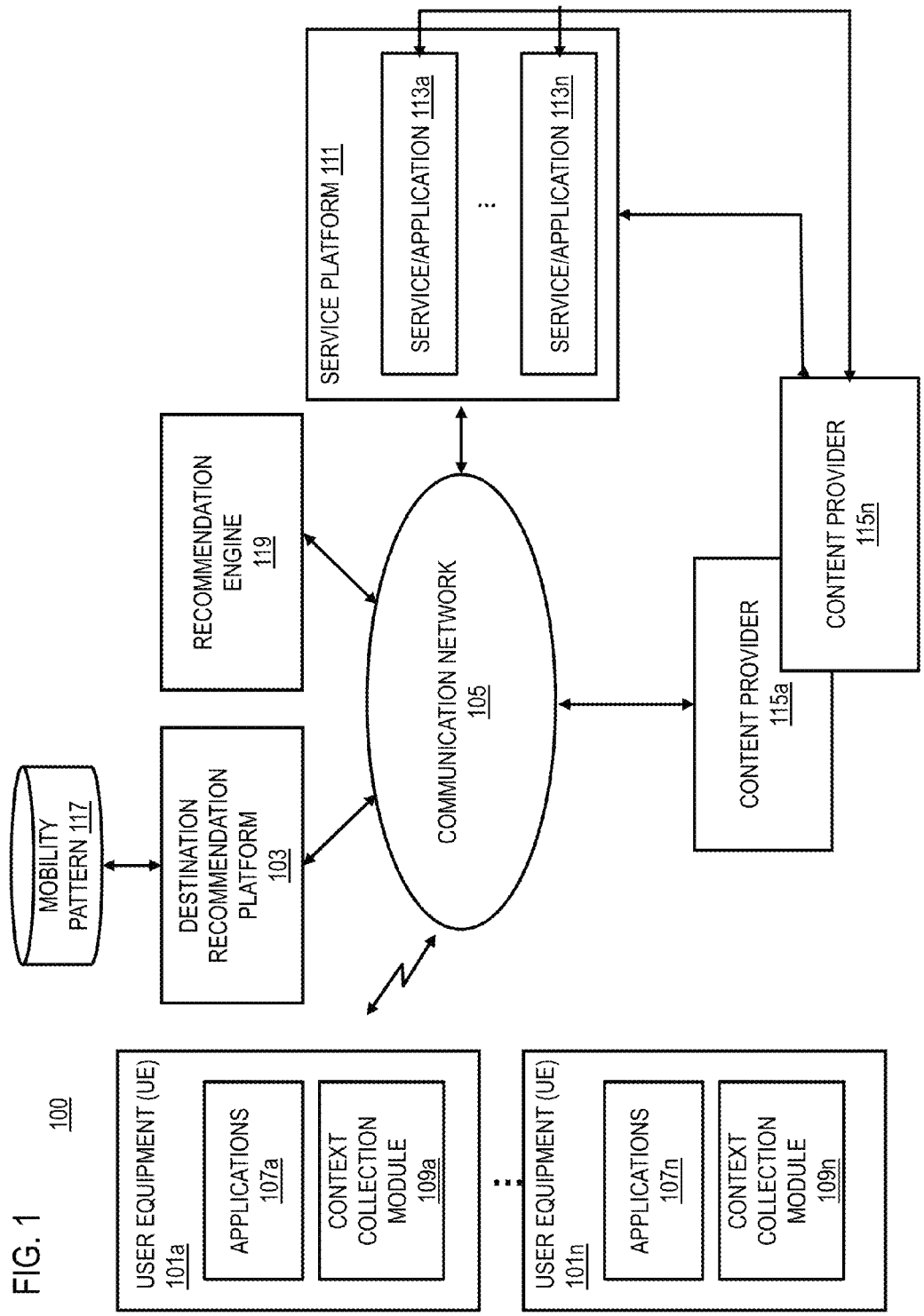
FIG. 1 is a diagram of a system capable of providing context-related destination location recommendations, according to one embodiment.

FIG. 1 is a diagram of a system capable of providing one or more context-related destination location recommendations, according to one embodiment. Traditionally, applications, for example, general mapping/navigation applications provide a recommendation for a destination irrespective of the user's needs and/or desires. For example, recommendations for destination locations can be provided at an inopportune time, for example, such as when a user is commuting to work and thereof can be perceived as nuisance or annoyance.

To address this problem, a system 100 of FIG. 1 introduces the capability to provide one or more recommended destination locations based on context of a user associated with the ability and/or openness of a user to receive such recommendations. Context may include but is not limited to current time, day, location (e.g., place (e.g., if static) or route (e.g., if moving), vehicle occupancy (e.g., if one or more passengers are present), among others, or a context thereof. The system 100 determines whether to present one or more recommendations if it determines the user has the ability and/or openness to receive such recommendations.

In one embodiment, the system 100 determines whether a user has an ability and/or openness to receive recommended destination locations based on the one or more predicted destination locations. In one embodiment, the system 100 determines whether to present one or more recommended destination locations based on probability information associated with each predicted destination location related to determined level of confidence that the location is the user's next destination. In this way, the system 100 can better identify key moments in which not to disturb the user (e.g., commuting to work) as well as when the user is need or at least perceptive for information. The probability information represents respective one or more probabilities that the at least one user will travel to the one or more predicted destination locations under at least one context.

The system 100 processes mobility pattern information associated with the at least one user to determine one or more predicted destination locations and associated probability information based on the context. The one or more predicted destination locations include but is not limited to a place, a route, or a combination thereof. The mobility pattern information includes past movements of a user. In one embodiment, the mobility pattern information captures statistical features of the user's past movement patterns. For example, the system 100 processes the mobility pattern information to determine a list of known destinations (e.g., a list of places visited by the user in the past) with respective probability that the user is visiting that location based on the context.

In one embodiment, the system 100 determines whether to cause a presentation of one or more recommended destination locations based on entropy information. For example, entropy information represents a lack of routine in a user's mobility pattern at a given context (e.g., at a particular location and/or time). In other words, if a user's mobility patterns indicate a distribution of destinations (e.g., known destinations) with low probabilities that a user will travel to a particular destination, then entropy is high. Conversely, entropy is low if there is one (or very few) destinations with a high probability that a user will travel there.

Accordingly, in one embodiment, the system 100 determines the entropy information based on a probability distribution of known destinations, a sum of the probabilities that a user will go to or select a particular known destination, or a combination thereof. The entropy information may include entropy of the probability distribution, the sum of probabilities, or a combination thereof. The system 100 determines not to cause a presentation when the sum probabilities are high (e.g., above a threshold) and/or distribution entropy is low (e.g., lower than a threshold). That is, the system 100 determines that the user's destination can be predicted with this confidence. In this case, the system 100 can proceed with assisting the user towards the predicted destination location. On the other hand, the system 100 determines to cause a presentation of recommended destinations when the sum of probabilities is low (e.g., below a threshold) and/or distribution entropy is high (e.g., above a threshold). In this case, the system 100 determines to cause a presentation of recommended locations when the user's destination cannot be predicted with confidence. In this way, the system 100 can determine when the user will likely be annoyed by recommendations, for example, because he is on his commute path and has no other intention than getting to his destination as efficiently as possible.

In one embodiment, routine can be considered to an inverse of entropy. Accordingly, the approach of the various embodiments described herein can also be discussed with respect to routine in place of entropy. For example, in one embodiment, the system 100 can determine whether the user has a need in assistance in his routine (e.g., information relevant to his projected trajectory) vs. an open recommendation for a destination location (e.g., what to do next) determines a routine level based on the mobility pattern information (e.g., places a visitor is visiting at specific times and from specific origins). The routine level can relate to a level of a routine a user has developed in a specific place and time context (e.g., previous user behavior). For example, if only a few (i.e., three or less) destination locations are predicted with a high total probability (e.g., above 90%), the routine level can be assumed to be high. In contrast, if many (e.g., more than ten) destination locations are predicted with a low total probability (e.g., below 50%), the routine level can be assumed to be low. If the system 100 determines that the routine level is low (e.g., the user cannot be predicted), the system 100 assumes that the user may not yet have a clear plan in mind and therefore would welcome one or more recommended destination locations to help make his decision.

The system 100 can also determine whether and/or when to present one or more recommendation destinations based on driving context information. The driving context information can include driving task intensity information, driving state information, and/or a combination thereof. For example, the system 100 may determine not to present one or more recommended destination locations if the user is focusing his attention on the road. In another example, the system 100 may determine timing as to when the user will not be focusing his attention on the road to present the one or more recommended destination locations.

The driving task intensity information is an approximation of the required attention a user needs to place on the road. The driving task intensity information can be an indicator for the complexness and/or difficulty associated with the current and/or upcoming driving tasks. The driving task information can differentiate between different levels such as complex driving tasks that require the user's full attention (e.g., lane change, turn manoeuver and/or pedestrian crossing), regular attention (e.g., straight on a highway at stable and/or reasonable speed), and low attention (e.g., stopping at a red light and/or rail crossing). Based on the provided route (e.g., navigation directions) and/or predicted route to a predicted destination location, the system 100 can determine levels associated with the upcoming driving tasks. For example, the system 100 may determine to present one or more recommended destination locations if the driving intensity is low and/or when the driving intensity is low in addition to high destination entropy.

The driving state information relates to the current state of the user with respect to the phase in which the user is currently driving. For example, states may include but are not limited to departure, arrival, transitioning, lost direction, long distance drive, commute, among others, or a combination thereof. The system 100 can determine the driving state information, for example, if the navigation is in a guidance mode (i.e., the user is following a predefined route).

The system 100 may also process mobility pattern information to determine familiarity information for the at least one user with respect to the at least one context. The mobility pattern information can also relate to frequency of visiting certain places and/or certain areas in the past. These frequencies can provide an understanding of the user's familiarity with certain places and/or areas. The familiarity information can represent different levels of familiarity (e.g., unknown, known, . . . very well known) with respect to a place, place type, link (e.g., road transition), and/or area.

The system 100 can determine the one or more recommended destination locations, the presentation of one or more recommended destination locations, or a combination based on the familiarity information. For example, the system 100 can determine known places and cause familiar places that the user has visited to be excluded from the recommended destination location(s). The system 100 can thereby favor providing recently opened recommended destination location(s). In this way, the system 100 can increase the relevance of the recommendations that are presented by using the familiarity information and context to determine the type of information that could be presented to a user at a given moment.

The familiarity information may include place familiarity information, place type familiarity information, link familiarity information, area familiarity information, or a combination thereof. The place familiarity information can relate to a level of familiarity with a place. The place familiarity information can be determined from the mobility pattern information by summing the number and/or duration of a visit specific to a place. In some embodiments, the place familiarity information can be discounted by an aging factor (e.g., how long ago where the visit(s). For example, the system 100 determines that the place is familiar or very familiar, the place (e.g., the destination location) can be excluded from the recommendations.

The place type familiarity information can be determined from the place familiarity information. The system 100 can derive the place type familiarity from all known familiar places of a user. The system 100 can create and/or compare the user and wider demographic scores per place type and/or sub type. The system 100 can thereby infer the user preference(s) from the place type familiarity information. For example, the system 100 can determine which specific destinations (e.g., restaurants, shops and/or types) that the user prefers from the place type familiarity information.

The link familiarity information relates to the user familiarity with transition through a street and/or road segment within an area. The system 100 can determine the link familiarity information based on the number of transitions driven by the user. The system 100 can discount the number of transitions by an aging factor and/or potentially known changes to a specific link.

The area familiarity information represents the general familiarity of a user with an area. The system 100 can determine the area familiarity information from a synthesis of the other familiarity information (e.g., the place familiarity information, the place type familiarity information, and/or the link familiarity information).

The system 100 can determine recommendations relevant to the user even when the system 100 determines that the user's destination cannot be predicted well from the mobility pattern information and context. In one embodiment, the system 100 can determine the user's history of visited and preferred places from process metadata (e.g., descriptive data) associated with the one or more predicted destination locations to determine one or more features of the predicted destination locations. For example, the system 100 can process the metadata to determine the services, type, distance from current location, etc. associated with the one or more predicted destination locations. The system 100 can then determine the one or more recommended destination locations based on the one or more features. For example, the system can determine feature probability distribution information with respect to one or more features and determine entropy information for one or more features based on the feature probability distribution information. The system 100 can determine to present one or more recommended destination locations based on the feature entropy information. The system 100 presents one or more recommended destination locations having the feature(s) exhibiting low entropy. For example, if the system 100 determines that 80% of the probability mass is covered by Chinese restaurants, the system 100 can determine to present restaurants that offer Chinese and/or Asian food.

In one embodiment, the system 100 can determine to present one or more recommended destination locations could be valuable to the user outside of at least one familiar zone. A familiar zone is based on user activity and can be defined by different familiarity areas. For example, the system 100 can determine at least one familiar zone based on the familiarity information. The system 100 can process mobility pattern information to determine at least one familiar zone for the at least one feature probability distribution information. The familiarity levels can indicate user knowledge level associated with the familiar zone. For example, the familiarity levels may include but are not limited to local expert, basic area knowledge, drive through knowledge, visiting, unknown, etc. The system can use these levels to guide recommendations towards meaningful places. For example, if the user is visiting on vacation, the user should receive recommendations for high profile places. In another example, if a user is a local expert, the user will likely prefer to receive recommendations and information about newly opened places (e.g., since his last visit).

The system 100 can present one or more recommend destination locations that are provided in an exploration zone outside the zone based on the ability and willingness of the user to reach that location and the user's relatively knowledge about that zone. The exploration area can represent an area outside the known or familiar zone of the user, but the user is willing to go to the destination based on the recommendation.

In one embodiment, the system 100 can determine an exploration zone by processing a mobility pattern information to determine information regarding a distance threshold that the at least one user travels in response to the at least one recommendation. For example, the system 100 can based the distance threshold on an average of distances of usual places outside the familiar zone that the user visits and/or average of transmit time to reach such place outside the familiar. The exploration area can thereby represent at least one area beyond the at least one familiar zone and within the destination threshold.

In one embodiment, the system 100 can further determine one or more candidate destination locations within the exploration zone to include in the one or more recommended destination locations based on the familiarity information, relevance information, travel cost information, or a combination thereof. Travel cost information can relate to the cost of reaching the candidate destination location. For example, the cost can relate to a time and/or effort required to get to the candidate destination location from the current location of the user or deviate from route that the user is or will be traveling. The system 100 can determine candidate destination locations based on the familiarity information and/or relevance information (e.g., past behavior and/or knowledge) to determine locations that may be potentially interesting places for the user. For example, the relevance information may relate to destination categories (tourist attraction, restaurant, etc.), preferred place categories, features of the destination (e.g., place specific information such as type, user ratings, price information, availability, etc.), driving context (e.g., driving state and/or intensity), among others, or a combination thereof. For example, the system 100 can exclude places known by the user from the candidate destination locations based on the familiarity information and/or boost one or more places based on the relevance information. Additionally, the system 100 can lower the relevance of one or more places based on the relevance information.

In one embodiment, the system 100 can select the one or more recommended destination locations from the one or more candidate destination locations by factoring the cost information. For example, the system 100 can determine a score based on the familiarity and/or relevance information and subtract the travel cost information to determine a recommendation relevance score. The system 100 can filter the actual relevant locations out of all the candidate destinations by that score. For example, the system 100 can compare the total value of the candidate destination locations and identify the most valuable ones by a certain number having the highest scores. Those may correspond to the one or more recommended destination locations selected from the one or more candidate destination locations.

In one embodiment, the travel cost information can also be based on time such as time of day or expected available time of the user from activity predictions (e.g., lunch break duration, sleeping time, next appointment, etc.). In this way, the system can place preference on places and/or areas (e.g., in the exploration zone) that the user has not yet visited but would be willing to visit based on familiarity information, relevancy information, cost information, or a combination thereof.

As shown in FIG. 1, the system 100 comprises one or more user equipment (UEs) 101a-101n (also collectively referred to as UEs 101) having connectivity to a destination recommendation platform 103 via a communication network 105. The UEs 101 may include or have access to an application 107 (or applications 107), which may consist of client programs, services, or the like that may utilize the destination recommendation platform 103, or other services, applications, content, etc. available over the communication network 105.

In one embodiment, context can be collected and monitored at the destination recommendation platform 103. In certain embodiments, the application 107 on the UE 101 can receive context associated with a context collection module 109 of the UE 101. For example, the context collection module 109 may utilize applications, services, sensors, etc., to collect such information. Information may include, for instance, location information, camera information, compass information, weather information, user calendar information, accelerometer information, financial transaction information, etc. In one embodiment, the context collection module 109 may have connectivity to a location determination sensor system, such as a Global Positioning System (GPS) to access GPS satellites to determine e.g., a location of the UE 101 and/or intended destination of the user. The UE 101 may then cause transmission of the collected contextual information (e.g., the profile information, location information, vehicle occupancy, etc.) to the platform 103 for processing to determine one or more predicted locations, one or more recommended destination locations, familiarity information, etc. In other embodiment, the destination recommendation platform may process the information collected by the context collection module 109 as mobility pattern information.

In one embodiment, the destination recommendation platform 103 can receive and store the mobility pattern information in a user profile associated with the user in a mobility pattern database 117. In certain embodiments, the user profile may include an identifier of the user (e.g., a username) and/or an identifier of the UE 101 (e.g., a hardware identifier such as International Mobile Equipment Identity (IMEI), a phone number, an Internet Protocol address, etc.

In one embodiment, the destination recommendation platform 103 can obtain content information associated with one or locations disposed with in one or more zones. The content, for instance, includes text information, location information of other user devices, mapping data, geo-tagged data (e.g., indicating locations of people, objects, images, etc.), coupons, ads, among others, or a combination thereof. The content may be provided by the service platform 111 which includes one or more services 113a-113 n (e.g., mapping service, content broadcasting service, etc.), the one or more content providers 115 a-115 n (e.g., online content retailers, public databases, etc.), other content source available or accessible over the communication network 105. In one embodiment, content is delivered from the content providers 115 a-115 n to the UE 101 through the service platform 111 and/or the services 113 a-113 n. For example, a service 113 a (e.g., a mapping service) may obtain content (e.g., map content) from a content provider 115 a to deliver a location-based user interface with the one or more recommended destination locations to the UE 101.

By way of example, the UE 101 may execute the application 107 to receive the one or more recommended destination locations from the destination recommendation platform 103 or other component of the network 105. As mentioned above, the application 107 and/or destination recommendation platform 103 performs one or more functions providing recommended location destinations. In one embodiment, the destination recommendation platform 103 acts as a filter that boosts or downgrades points of interest or other results of an external recommendation engine 119. By way of example, the external recommendation engine can be any state-of-art recommender system (e.g., for points of interest) that typically relies on statistics of many users (e.g., user ratings of places, visit statistics of places, user-that-prefer-tis-may-like-that statistics, etc.). In addition or alternatively, the recommendation engine 119 can be incorporated in the destination recommendation platform 103.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101 and the destination recommendation platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
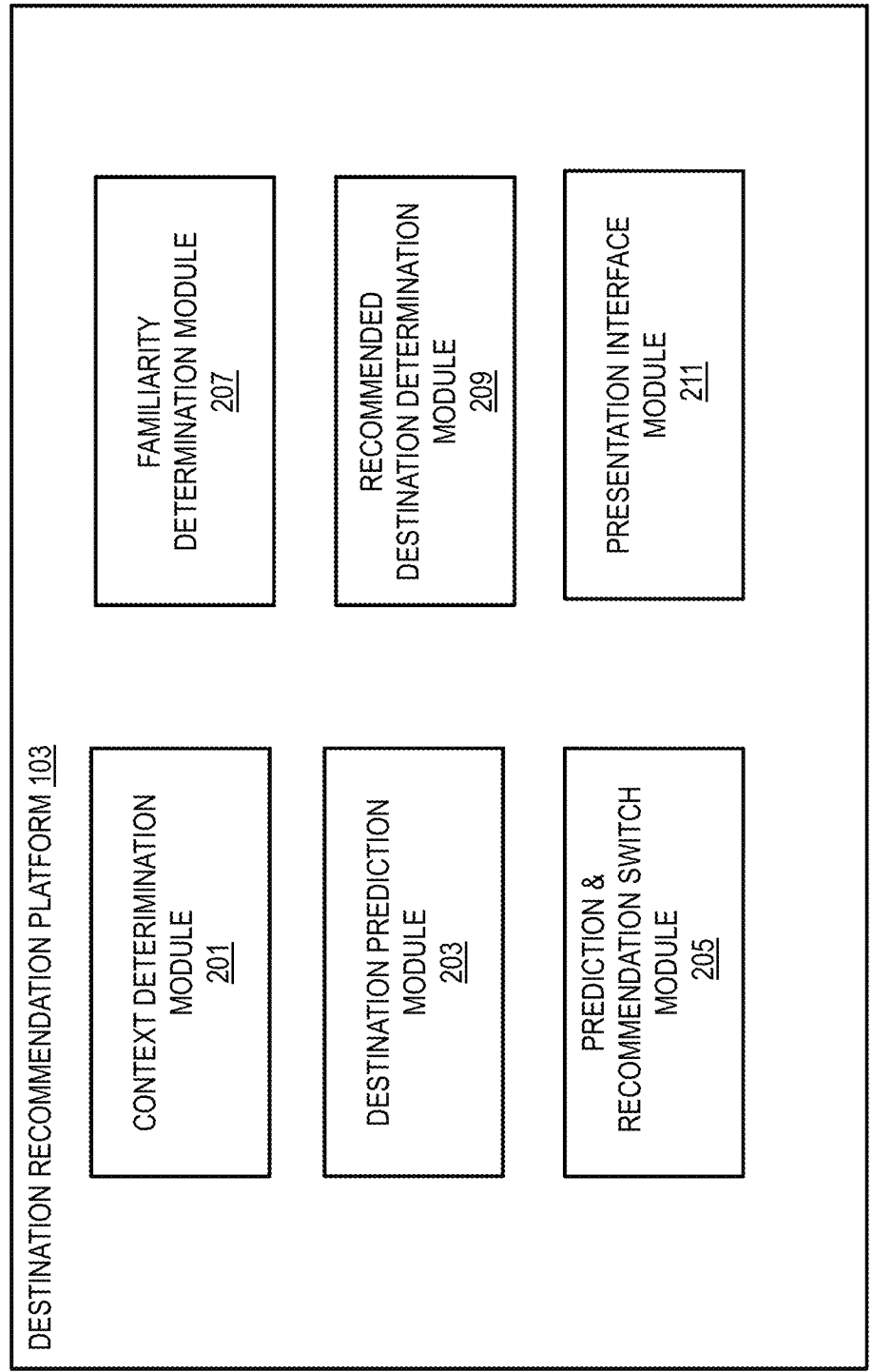
FIG. 2 is a diagram of the components of the destination recommendation platform according to one embodiment.

FIG. 2 is a diagram of the components of the destination recommendation platform, according to one embodiment. By way of example, the destination recommendation platform 103 includes one or more components for providing context-related destination location recommendations. It is contemplated that the functions of these components may be combined in one or more components or performed by other components of equivalent functionality. In this embodiment, the destination recommendation platform includes a context determination module 201, a destination prediction module 203, a prediction and recommendation switch module 205, a familiarity determination module 207, a recommended destination determination module 209, and a presentation interface module 211. It is contemplated that all or a portion of the functions of destination recommendation platform 103 may be performed by the application 107 of the UE 101.

In one embodiment, the context determination module 201 can determine the context of the user. For example, the context determination module 201 can process the collected context information to determine the current time, current weekday, current location (e.g., current place and/or current route), current vehicle occupancy, among others, or a combination thereof.

The destination prediction module 203 can determine one or more predicted destination locations and associated probability information based on context by processing mobility pattern information. For example, the destination prediction module 203 can determine one or more predicted destination locations a user and/or passenger(s) has visited (mobility pattern information) at specific times and/or origins (context). The destination prediction module 203 can process the probability information to determine entropy information, probability distribution, a sum of probabilities, or a combination thereof from the probability information. For example, the entropy information, probability distribution, a sum of probabilities or a combination can indicate the confidence that the one or more predicted destination locations is the possible next destination.

The prediction and recommendation switch module 205 determines whether to cause one or more recommended destination locations to be presented based on the entropy information, probability distribution, the sum of probabilities or a combination thereof. The prediction and recommendation switch module 205 determines to present the one or more recommended destination locations if the entropy information, probability distribution, a sum of probabilities or a combination indicate that the one or more predicted destination locations cannot be predicted with confidence. For example, the prediction and recommendation switch module 205 may compare this information to a threshold to determine whether the entropy is high and/or the total probability is low. Those conditions indicate that the user's destination cannot be predicted with confidence and thus the prediction and recommendation switch module 205 causes the one or more recommended destination locations to be presented. If the prediction and recommendation switch module 205 determines the total probability is high and/or entropy is low, then the prediction and recommendation switch module 205 determines not to present one or more recommended destination locations. Those conditions indicate that the next destination of the user can be predicted with confidence and thus the driver will likely be annoyed to receive a recommendation. For example, the prediction and recommendation switch module 205 determines that the user is commuting to work. The prediction and recommendation switch module 205 may then determine to assist the user to his destination without presenting the one or more recommended destinations.

The familiarity determination module 207 can determine familiarity information for at least one user with respect to the at least one by processing mobility pattern information. The familiarity determination module can determine place familiarity information, place type familiarity information, link familiarity information, area familiarity information, or a combination thereof.

The recommended destination determination module 209 can determine one or more recommended destination locations based on the familiarity information. In one embodiment, the recommended destination determination module 209 can determine to exclude any destination that is familiar or very familiar to the user. In certain embodiments, the recommended destination determination module 209 can tune the one or more recommended destination locations based on the familiarity information. For example, the more familiar that the familiarity determination module determines that the user is with an area, the recommended destination determination module 209 focuses on newer, smaller and/or off the path destinations.

In one embodiment, the recommended destination determination module 209 can determine one or more recommended destination locations based on one or more features of each predicted destination location (e.g., type of place, distance from current location, etc.) and/or previously visited destination in the same context. The recommended destination determination module 209 can determine entropy of the distribution of the values for each feature to determine one or more features that exhibit low entropy. The recommended destination determination module 209 can focus on destination locations that exhibit the same features having low entropy. For example, the recommended destination determination module 209 can determine that the user likes Chinese restaurants for lunch, cocktail bars on Friday night, fuel stations on Monday morning, etc., and therefore the recommended destination determination module 209 can determine or more recommended destination locations having the similar feature.

In one embodiment, the recommended destination determination module 209 can determine one or more recommended destination locations that are disposed outside of at least one familiar zone (e.g., familiar area) and disposed in an exploration zone. The recommended destination determination module 209 can determine the exploration zone based on determining the familiar zone. The exploration zone can be within a distance threshold that the recommended destination determination module 209 determines. The recommended destination determination module 209 can determine one or more candidate locations from which the one or more recommended destination locations can be selected. The recommended destination determination module 209 can determine familiarity information, relevance information, travel cost information, or a combination thereof for each candidate location. The recommended destination determination module 209 can determine the selection of the one or more recommended destination locations based on such information.

The presentation interface module 211 can cause the one or more recommended destination locations to be presented to the user, for example, on a mapping user interface. In one embodiment, the timing of the presentation may be based on driving context. For example, the presentation interface module 211 may determine to present the one or more recommended destination locations, for example, when the road attention is normal or low.

Figure 3A:
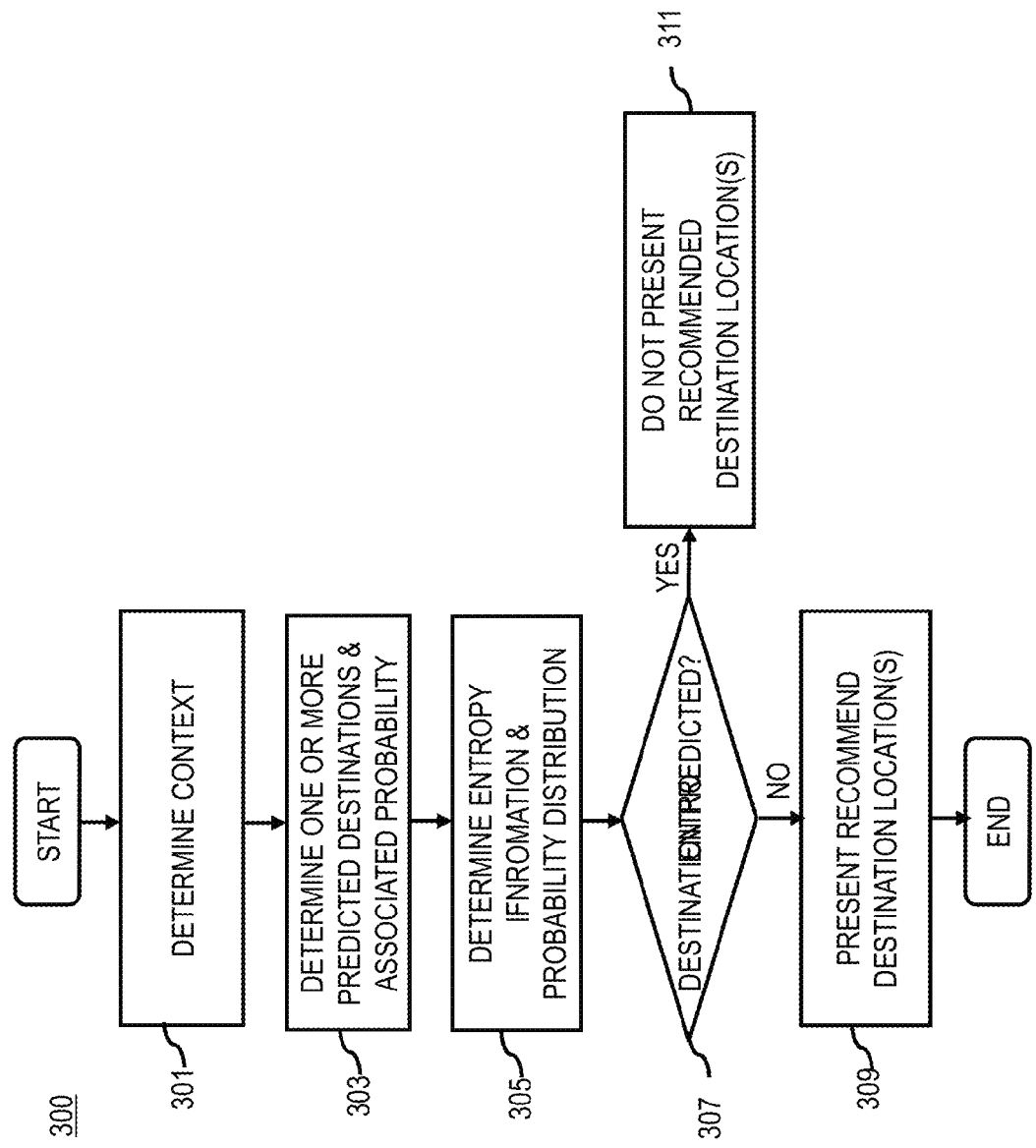
FIGS. 3A-3C are flowcharts of a process for context-related destination location recommendations, according to one embodiment.
Figure 3B:
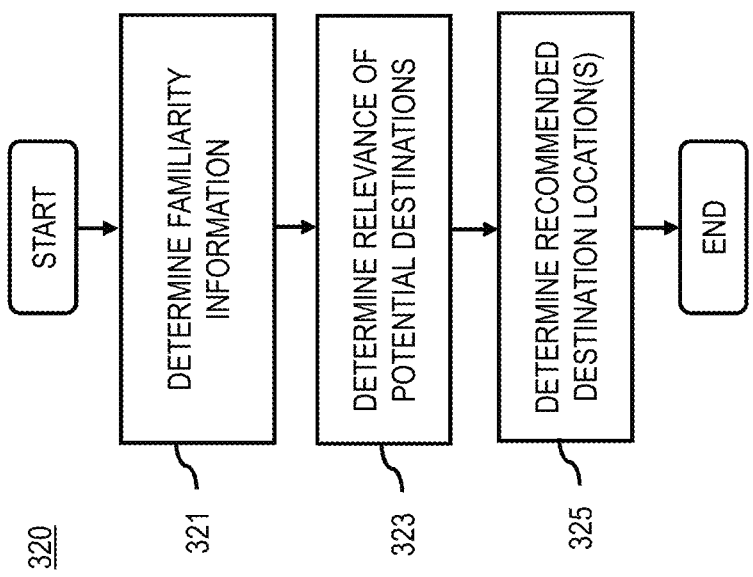
Figure 3C:
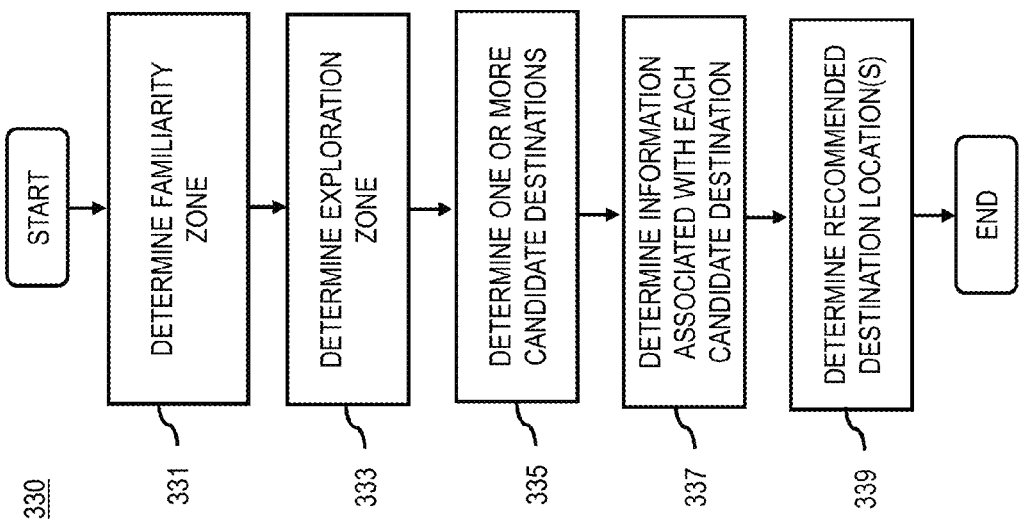
Figure 6:
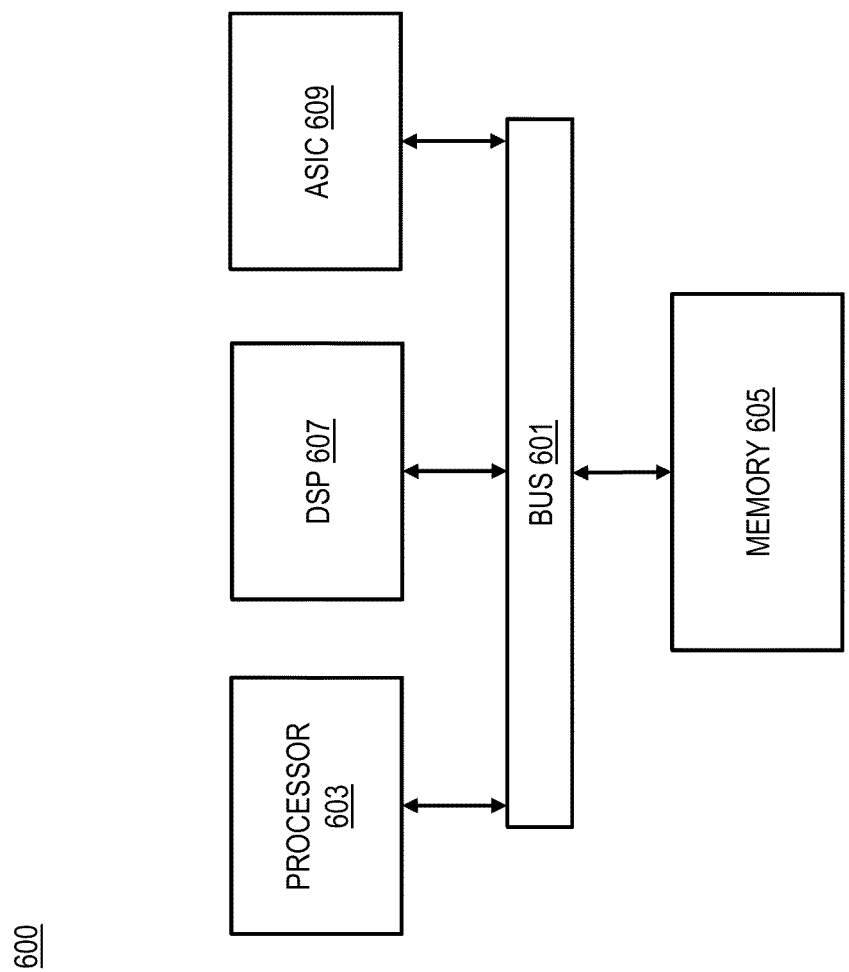
FIG. 6 is a diagram of a chip set that can be used to implement an embodiment of the invention.

FIGS. 3A-3C are flowcharts of a process for providing context-related destination location recommendations, according to one embodiment. In one embodiment, the destination recommendation platform performs the process 300 and is implemented in, for instance, a chip set including a processor and a memory as shown in FIG. 6.

FIG. 3A is a flowchart of a process for determining whether or not to present one or more recommended destination locations based on one or more predicted locations. In step 301, the destination recommendation platform 103 determines at least one context associated with at least one user. For example, the destination recommendation platform 103 determines the time, weekday, location (e.g., current place, current route, etc.), vehicle occupancy, among others processes.

In step 303, the destination recommendation platform 103 may then process mobility pattern information to determine one or more predicted destination locations. For example, based on the context, the destination recommendation platform 103 may include the at least one user weekly driving pattern. Based on the context of the user and/or passenger, the destination recommendation platform 103 may determine one or more predicted destination locations. For example, if it is lunch time and the user usually goes for Chinese food, then the destination recommendation platform may determine one or more Chinese food restaurants. The destination recommendation platform 103 may also determine probability information (step 305) with respect to each predicted destination location.

The destination recommendation platform 103 may then process the probability information to determine the prediction confidence (step 305). The destination recommendation platform 103 may process the probability information to determine entropy information, total probability distribution, a sum of probabilities, among others, or a combination thereof.

The destination recommendation platform 103 may determine whether the destination prediction is predicted with confidence based on entropy information (step 307). If the destination recommendation platform 103 determines that the entropy information is low and/or total probability is high, then the destination recommendation platform 103 determines that the predicted destination location is with confidence (YES at step 307). For example, the destination prediction with confidence indicates that the user would likely perceive a notification as an annoyance and thus the destination recommendation platform does not present recommended destination locations (step 311). Instead, the destination recommendation platform 103 may cause the device to continue to assist the user to the predicted destination location.

If the destination recommendation platform 103 determines that the entropy information is high and/or total probability is low, then the destination recommendation platform 103 determines that the predicted destination location is without confidence (NO at step 307). For example, the destination prediction without confidence can indicate that the user's next move is unpredictable and infer that the user is more flexible at his next move. The destination recommendation platform 103 causes the one or more recommended destination locations to be presented based on the determination that the predicted destination location is without confidence (step 309).

In one embodiment, the timing of the presentation may be based on driving context, for example, the driving task intensity information. For example, the destination recommendation platform 103 may cause the presentation of the one or more recommended destination locations when the upcoming or current driving task does not require the full attention of the user.

FIGS. 3B and 3C show processes of determining one or more recommended destinations based on context, according to one embodiment. In step 321 of FIG. 3B, the destination recommendation platform 103 can process mobility pattern information to determine familiarity information for at least one user with respect to the at least context.

The destination recommendation platform 103 may then determine relevance information of potential destinations (step 323). In one embodiment, the destination recommendation platform 103 may filter places according to familiarity level of the area. For example, within more familiar areas, less known, recently opened and/or updated places within familiar areas as compared to known places may be considered more relevant. Within less familiar areas, popular and established places within less familiar areas may also be considered more relevant. The destination recommendation platform 103 may consider known places in familiar areas to be less relevant. In one embodiment, the destination recommendation platform 103 may omit such places from the determination of the one or more recommended destination locations.

In one embodiment, the destination recommendation platform 103 may determine the relevancy based on one or more features of the predicted destination locations. The destination recommendation platform 103 may process metadata associated with one or more predicted destination locations to determine features associated with each predicted destination location (e.g., type of place, distance from current location, etc.) and determine the entropy information associated with the features. The destination recommendation platform 103 may process the predicted destination locations to determine which predicted destination location(s) exhibit the features exhibiting low entropy.

The destination recommendation platform 103 may then determine or more recommended destination locations based on the familiarity information, the relevance information, among others, or a combination thereof (step 325).

In one embodiment, the destination recommendation platform 103 may determine one or more recommended destination locations that are outside the familiar area. FIG. 3C shows a process of determining one or more recommended destination locations that are disposed within an exploration zone.

In step 331, the destination recommendation platform 103 may determine the familiarity zone. The destination recommendation platform 103 may process the mobility pattern information to determine at least one familiar zone. For example, the destination recommendation platform 103 may determine the at least one familiar zone based on user activity indicated in the mobility pattern information.

The destination recommendation platform 103 may then determine the at least one exploration zone based on the at least one familiar zone (step 333). For example, the destination recommendation platform 103 may process the mobility pattern information to determine a distance threshold that the at least one user travels in response to at least one recommendation.

The destination recommendation platform 103 may determine one or more candidate destination locations disposed within the exploration zone (step 335). The destination recommendation platform 103 may determine one or more candidate destination locations based on past behavior as well as other relevance indicators.

The destination recommendation platform 103 may determine familiarity information, relevance information, travel cost information, or a combination thereof for one or more candidate destination locations (step 337). For example, the destination recommendation platform 103 may use this information for comparison of relevancy and/or valuableness to the user. For example, the destination recommendation platform 103 can consider a place more relevant based on the location. The locations that are less familiar to the user are considered to be more relevant. The relevance information may relate to confidence that the specific recommendation is useful to the specific user (e.g., financial benefit (save money), emotional benefit (favorite food), etc.). The relevance information may be determined from previous user activity and/or place specific information. For example, the destination recommendation platform 103 may determine that the user's favorite food is Indian. The travel cost information (e.g., user cost to get to the location (i.e., time or effort and/or deviation from a known route required to travel to the location)) may can be counted against the familiarity information and/or the relevance information. For example, the added distance and/or time for the user to reach a destination can act as a penalty toward a destination's overall value to a user. Additionally, the time of date and expected available time of the user from activity predictions (e.g., lunch break duration, sleeping time, next appointment) may also be factored in determining a value of a candidate destination.

The destination recommendation platform 103 may select one or more recommended destinations from the one or more candidate locations based on the familiarity information, relevance information, travel cost information, or a combination thereof (step 339). The value corresponding to this information may be used to compare the candidate destination locations and to determine which are the most valuable (e.g., relevant) locations. The destination recommendation platform 103 may select those indicated as most valuable. By way of example, the context is lunch time and the user's favorite food is Indian. In this example, the destination recommendation platform may choose those restaurants that have a cheaper lunch menu, shorter distance (e.g., lower fuel price), and/or that are unfamiliar to the user.

Figure 4A:
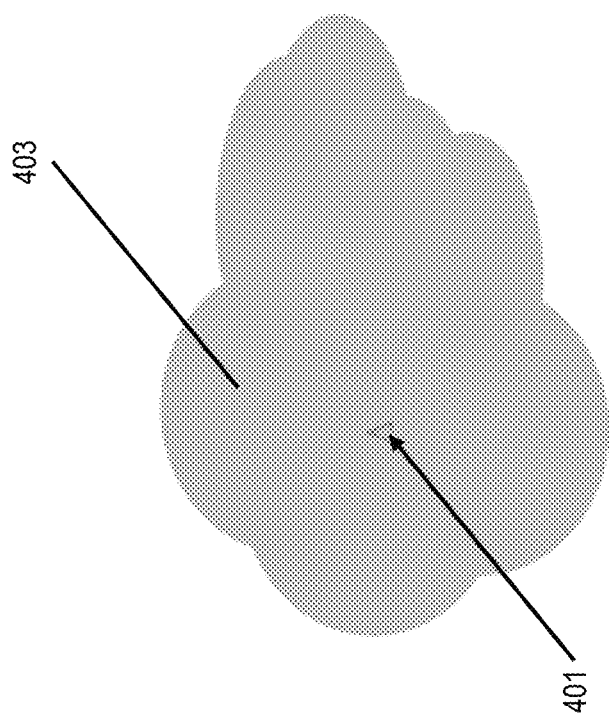
FIGS. 4A-4D are diagrams of familiar and exploration zones utilized in the processes of FIG. 3, according to various embodiments.

FIGS. 4A-4D show examples of diagrams utilized in the processes of FIGS. 3A-C to determine an exploration zone and one or more recommended destination locations within the exploration zone, according to various embodiments. FIG. 4A shows a diagram 400 of a familiar zone 403 that is determined based on mobility pattern information for a user whose is currently at location 401 for the at least one context. In one embodiment, the familiar zone may be sub/divided into different familiarity levels. In this example, the context is lunch time.

Figure 4B:
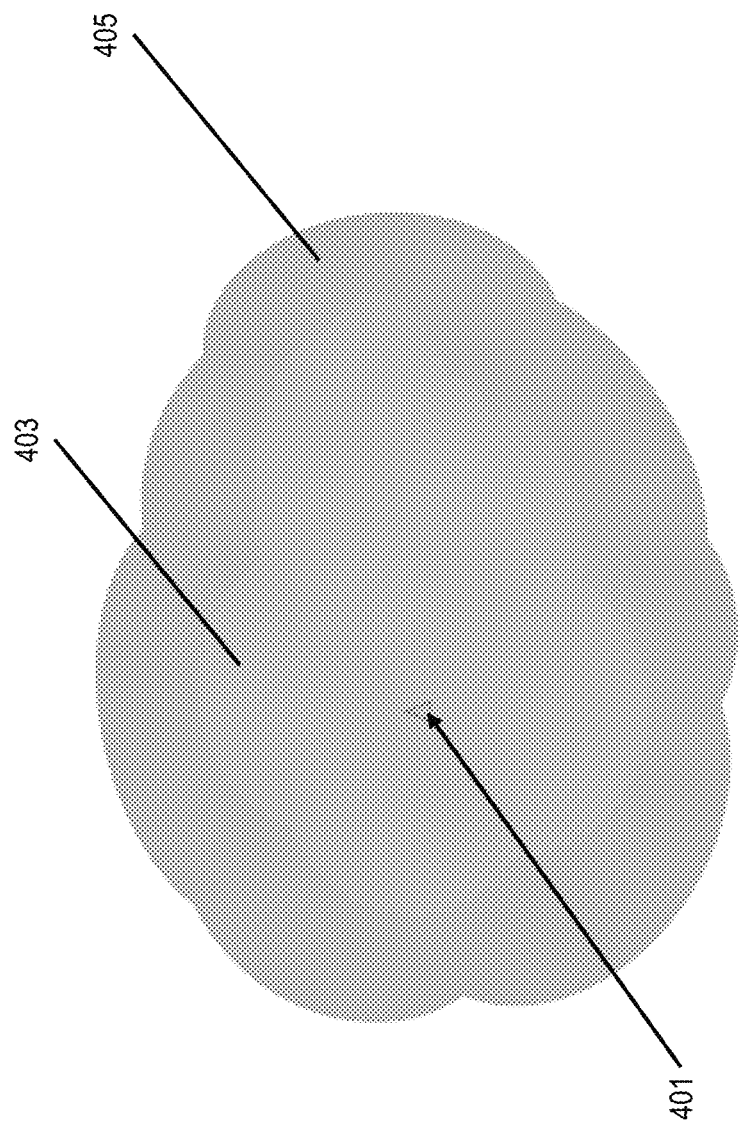

FIG. 4B shows a diagram 410 of an exploration zone 405 calculated based on the familiar zone 403. In this example, the destination recommendation platform 103 calculated an exploration range based one the distance the user has traveled to one or more destinations that the user during lunchtime.

Figure 4C:
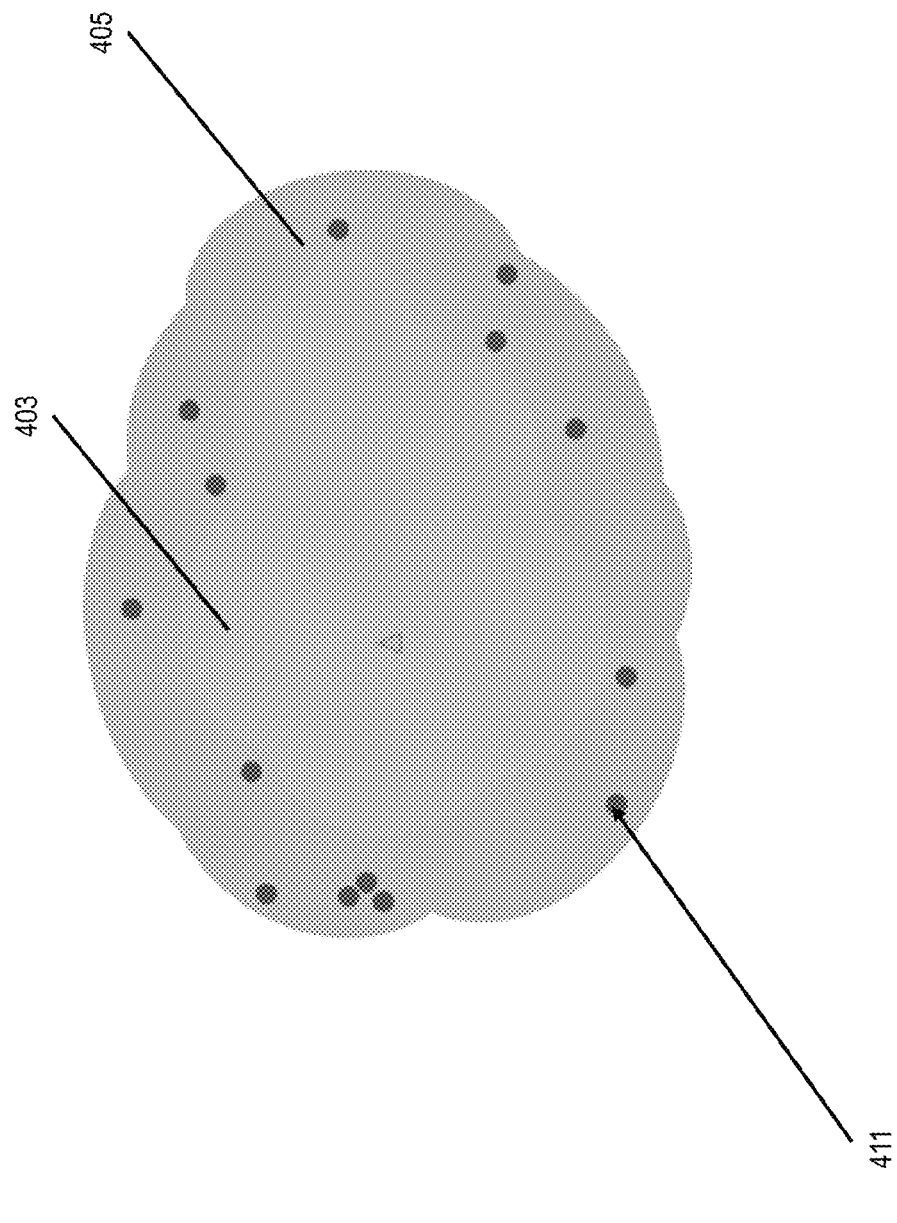

FIG. 4C shows a diagram 420 of one or more candidate destination locations 411 disposed within the exploration zone 405 determined based on mobility pattern information (e.g., past behavior) and other relevance indicators. The candidate destination locations 411 may identify all places of potential interest to the user and/or provide for some broad level general filtering without specifying any recommended locations from among the candidate locations. If a broad category of filtering is applied (e.g., a food filter), the locations 411, for instance, may each be an establishment (e.g., restaurant, food truck, stand, etc.) that serves food.

Figure 4D:
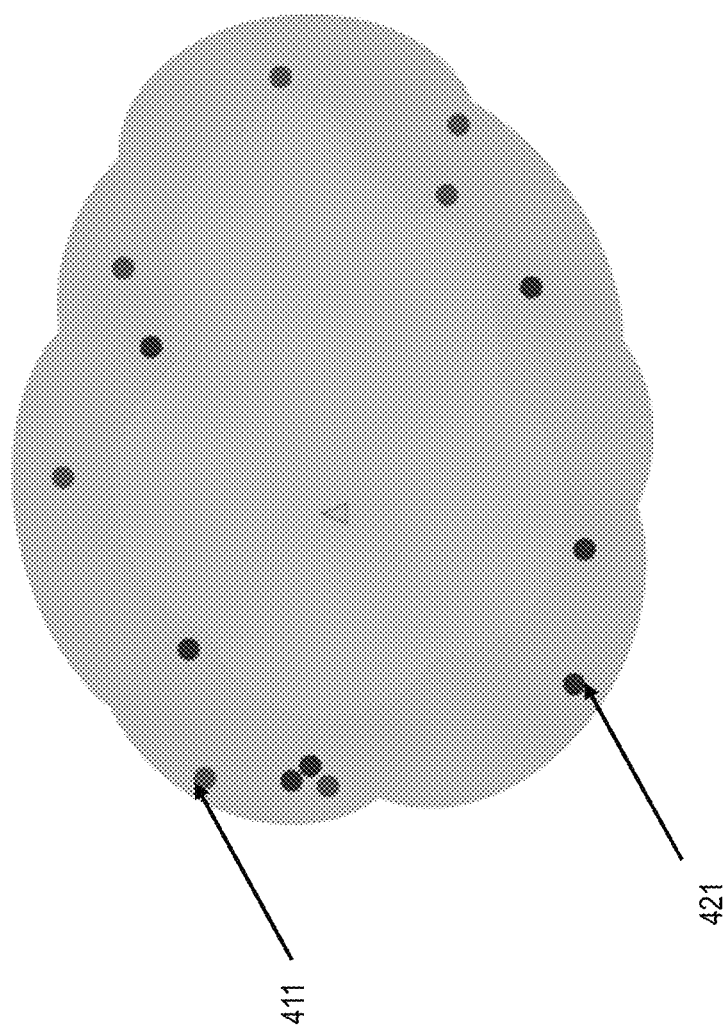

FIG. 4D shows a diagram 430 of the one or more recommended destination locations 421 selected from the one more candidate destination locations 411 by the destination recommendation platform 103. The destination recommendation platform 103 processed the familiarity information, the relevance information, travel cost information, or a combination thereof to determine the selection. In the above example, the destination recommendation platform 103 can filter the candidate destination locations 411 of FIG. 4C by selecting establishments that are potentially relevant to the user's context. For example, if the context indicates that is approximately lunch time, the destination recommendation platform 103 can recommend locations 421 that provide lunch, lunch deals (e.g., save user money), express lunch (e.g., user cannot be late to next appointment), and/or a specific type of food(s) (e.g., user goes for Chinese and/or pizza during lunch). In addition, the locations 421 can also be recommended based on time and/or effort required to travel (e.g., distance and/or traffic) to the location 421.

The processes described herein for providing context-related destination location recommendations may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
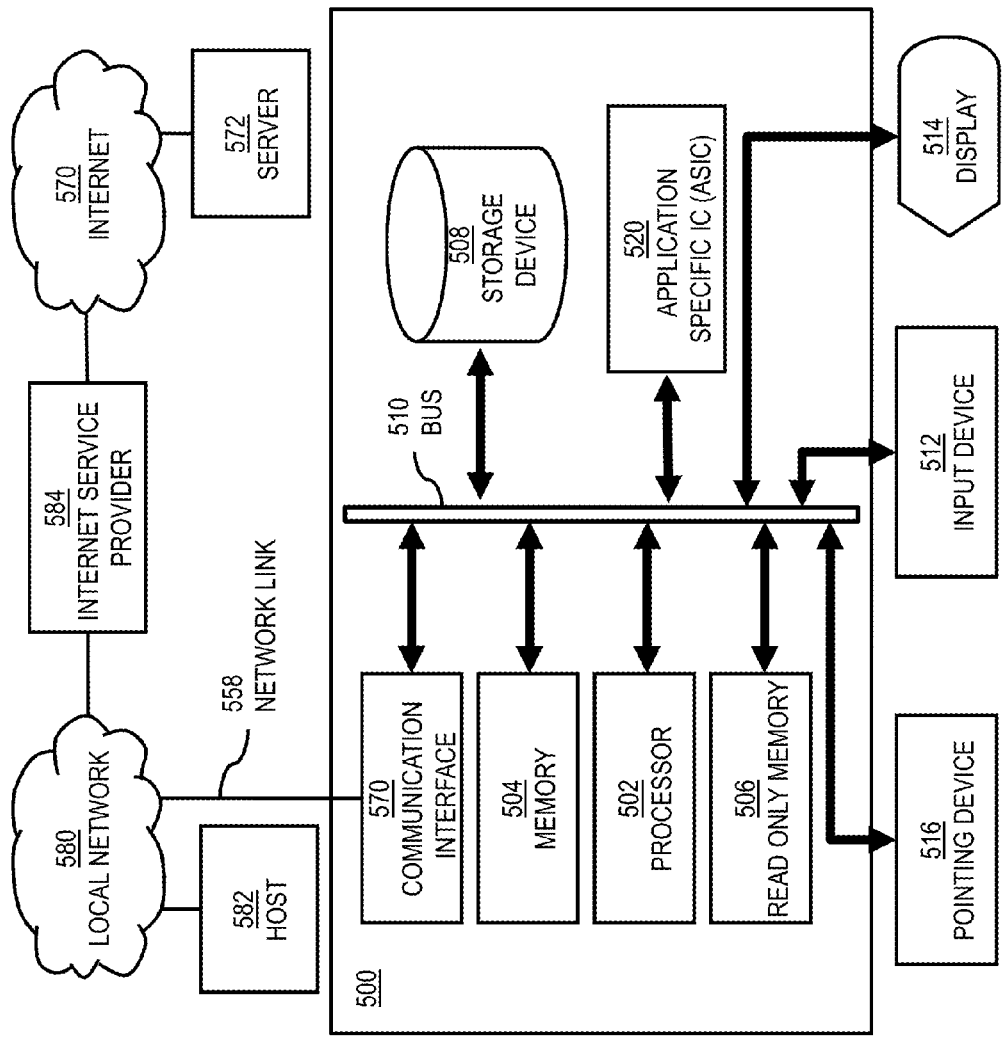
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide context-related destination location recommendations as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing context-related destination location recommendations.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to providing context-related destination location recommendations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for providing context-related destination location recommendations. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing context-related destination location recommendations, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for providing context-related destination location recommendations to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to provide context-related destination location recommendations as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of providing context-related destination location recommendations.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to providing context-related destination location recommendations. The memory 605 also stores the data associated with or generated by the execution of the inventive steps.

Figure 7:
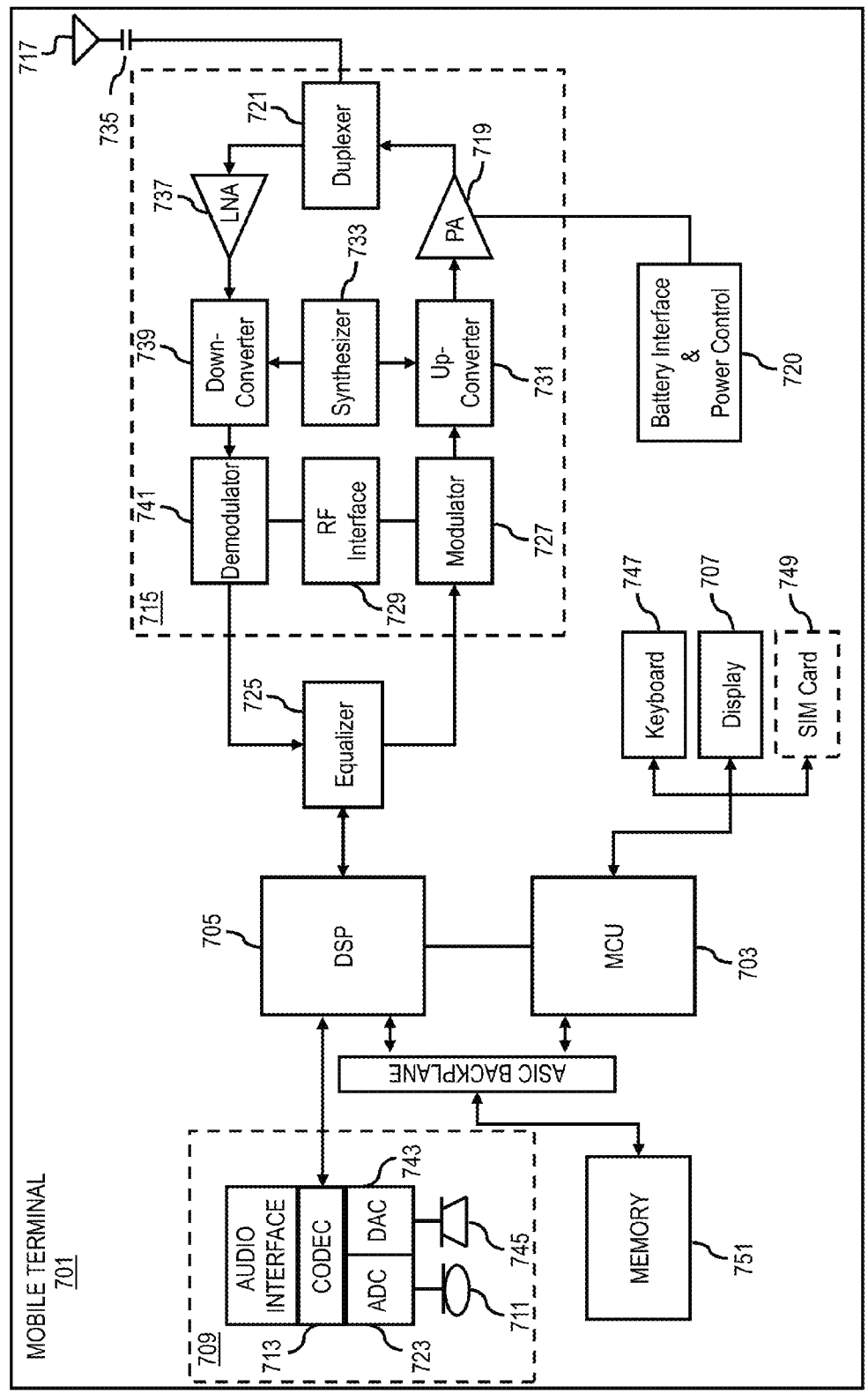
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of providing context-related destination location recommendations. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing context-related destination location recommendations. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to providing context-related destination location recommendations. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
determining, by an apparatus, at least one context associated with at least one user;
processing, by the apparatus, mobility pattern information associated with the at least one user to determine one or more predicted destination locations and associated probability information based, at least in part, on the at least one context, wherein the probability information represents respective one or more probabilities that the at least one user will travel to the one or more predicted destination locations under the at least one context;
determining, by the apparatus, entropy information based, at least in part, on the probability information under the at least one context;
determining, by the apparatus, one or more travel costs for the at least one user to travel to the one or more predicted destination locations; and
determining, by the apparatus, whether to initiate a presentation of one or more recommended destination locations among the one or more predicted destination locations to the at least one user based, at least in part, on the entropy information and the one or more travel costs.

2. A method of claim 1, further comprising:
processing the probability information to determine a probability distribution, a sum of probabilities, or a combination thereof;
factoring the one or more travel costs in the sum of the probabilities to obtain a score;
determining to not initiate the presentation of the one or more recommended destination locations if the score is below a threshold value; and
initiating the presentation of the one or more recommended destination locations if the score is above a threshold value.

3. A method of claim 1, further comprising:
processing the mobility pattern information to determine familiarity information for the at least one user with respect to the at least one context,
wherein a determination of the one or more recommended destination locations, the presentation of one or more recommended destination locations, or a combination is further based, at least in part, on the familiarity information.

4. A method of claim 3, wherein the familiarity information includes, at least in part, place familiarity information, place type familiarity information, link familiarity information, area familiarity information, or a combination thereof.

5. A method of claim 3, further comprising:
processing metadata associated with the one or more predicted destination locations to determine one or more features, wherein the one or more features include user preference on locations that the user has not yet visited and is willing to visit, wherein the one or more recommended destination locations are further determined based, at least in part, on the one or more features.

6. A method of claim 5, further comprising:
processing the mobility pattern information to determine feature probability distribution information with respect to the one or more features;
determining feature entropy information for the one or more features based, at least in part, the feature probability distribution information; and
determining the one or more recommended destination locations based, at least in part, on the feature entropy information.

7. A method of claim 1, further comprising:
processing the mobility pattern information to determine at least one familiar zone for the at least one context; and
determining at least one exploration zone based, at least in part, on the at least one familiar zone, wherein the one or more recommended destination locations is determined from the at least one exploration zone, and wherein the one or more travel costs are calculated based on one or more prices associated with travelling to the one or more predicted destination locations, a travel time of day, a predicted available time of the at least one user, a deviation from a known route required to travel to the one or more predicted destination locations, or a combination thereof.

8. A method of claim 7, further comprising:

processing the mobility pattern information to determine information regarding a distance threshold that the at least one user travels in response to at least one recommendation, wherein the at least one exploration zone represents at least one area beyond the at least one familiar zone and within the distance threshold.

9. A method of claim 7, further comprising:

determining familiarity information, relevance information, or a combination thereof for one or more candidate destination locations in the at least one exploration zone; and selecting the one or more recommended destination locations from the one or more candidate destination locations based, at least in part, on the familiarity information, the relevance information, or a combination thereof.

10. A method of claim 1, further comprising:

processing the mobility pattern information to determine one or more known locations of the at least one user; and excluding the one or more known locations from the one or more recommended destination locations, wherein the one or more travel costs are factored in by subtracting the one or more travel costs from the sum of the probabilities.

11. A method of claim 1, wherein the at least one context comprises a current time, a current weekday, a current static location or movement along a route of travel, a current vehicle occupancy, or a combination thereof.

12. A method of claim 1, wherein the context comprises driving task intensity, the method further comprising:

determining the driving task intensity information based on a route of travel to the one or more predicted locations, wherein the driving task intensity requires the at least one user's full attention, the at least one user's regular attention, or the at least one user's low attention under the context.

13. An apparatus comprising:

at least one processor; and at least one memory including computer program code for one or more programs, the at least one memory and the computer program code configured to, with the at least one processor, cause the apparatus to perform at least the following, determine at least one context associated with at least one user;

process mobility pattern information associated with the at least one user to determine one or more predicted destination locations and associated probability information based, at least in part, on the at least one context, wherein the probability information represents respective one or more probabilities that the at least one user will travel to the one or more predicted destination locations under the at least one context;

determine entropy information based, at least in part, on the probability information under the at least one context;

determine one or more travel costs for the at least one user to travel to the one or more predicted destination locations; and determine whether to initiate a presentation of one or more recommended destination locations among the one or more predicted destination locations to the at least one user based, at least in part, on the entropy information and the one or more travel costs.

14. An apparatus of claim 13, wherein the apparatus is further caused to:

process the probability information to determine a probability distribution, a sum of probabilities, or a combination thereof;

determine to not initiate the presentation of the one or more recommended destination locations if the sum of the probabilities is below a probability sum threshold value; and initiate the presentation of the one or more recommended destination locations if the sum of the probabilities is above a probability distribution threshold value.

15. An apparatus of claim 14, wherein the apparatus is further caused to:

process the mobility pattern information to determine familiarity information for the at least one user with respect to the at least one context, wherein a determination of the one or more recommended destination locations, the presentation of one or more recommended destination locations, or a combination is further based, at least in part, on the familiarity information.

16. An apparatus of claim 15, wherein the familiarity information includes, at least in part, place familiarity information, place type familiarity information, link familiarity information, area familiarity information, or a combination thereof.

17. An apparatus of claim 15, wherein the apparatus is further caused to:

process metadata associated with the one or more predicted destination locations to determine one or more features; and determine the one or more recommended destination locations based, at least in part, on the one or more features.

18. An apparatus of claim 17, wherein the apparatus is further caused to:

process the mobility pattern information to determine feature probability distribution information with respect to the one or more features;

determine feature entropy information for the one or more features based, at least in part, the feature probability distribution information; and determine the one or more recommended destination locations based, at least in part, on the feature entropy information.

19. An apparatus of claim 13, wherein the apparatus is further caused to:

process the mobility pattern information to determine at least one familiar zone for the at least one context; and determine at least one exploration zone based, at least in part, on the at least one familiar zone, wherein the one or more recommended destination locations is determined from the at least one exploration zone.

20. A non-transitory computer-readable storage medium carrying one or more sequences of one or more instructions which, when executed by one or more processors, cause an apparatus to perform the following steps:
- determining at least one context associated with at least one user;
- processing mobility pattern information associated with the at least one user to determine one or more predicted destination locations and associated probability information based, at least in part, on the at least one context, wherein the probability information represents respective one or more probabilities that the at least one user will travel to the one or more predicted destination locations under the at least one context;
- determining entropy information based, at least in part, on the probability information under the at least one context;
- determining one or more travel costs for the at least one user to travel to the one or more predicted destination locations; and
- determining whether to initiate a presentation of one or more recommended destination locations among the one or more predicted destination locations to the at least one user based, at least in part, on the entropy information and the one or more travel costs.

21. A computer-readable storage medium of claim 20, wherein the apparatus is further caused to perform:
- processing the probability information to determine a probability distribution, a sum of probabilities, or a combination thereof;
- determining to not initiate the presentation of the one or more recommended destination locations if the sum of the probabilities is below a probability sum threshold value; and
- initiating the presentation of the one or more recommended destination locations if the sum of the probabilities is above a probability distribution threshold value.

22. A computer-readable storage medium of claim 20, wherein the apparatus is further caused to perform:
- processing the mobility pattern information to determine familiarity information for the at least one user with respect to the at least one context,
- wherein a determination of the one or more recommended destination locations, the presentation of one or more recommended destination locations, or a combination is further based, at least in part, on the familiarity information.

* * * * *